March 28, 1950     J. C. BLUNT     2,501,928
ANIMAL TRAP

Filed July 6, 1948     2 Sheets-Sheet 1

INVENTOR.
BY Jack C. Blunt
John H. Ruckman
Attorney

March 28, 1950  J. C. BLUNT  2,501,928
ANIMAL TRAP

Filed July 6, 1948  2 Sheets-Sheet 2

INVENTOR.
Jack C. Blunt
BY John H. Ruckman
attorney

Patented Mar. 28, 1950

2,501,928

UNITED STATES PATENT OFFICE 2,501,928

ANIMAL TRAP

Jack C. Blunt, Lafitte, La., assignor of one-tenth to Oliver T. Fabre, Lafitte, La.

Application July 6, 1948, Serial No. 37,222

1 Claim. (Cl. 43—88)

My invention relates to an animal trap the construction of which is adaptable for embodying in a trap for trapping either small or large animals.

An object of this invention is to provide an improved trap which will prevent trapped animals from twisting off the caught leg and escaping.

The novel features which I believe to be characteristic of this invention are set forth with particularity in the appended claim. The invention itself, however, both as to its organization and manner of operation, together with additional objects and advantages thereof, will be best understood from the following description of a specific embodiment when read in connection with the accompanying drawings in which—

Figure 1:
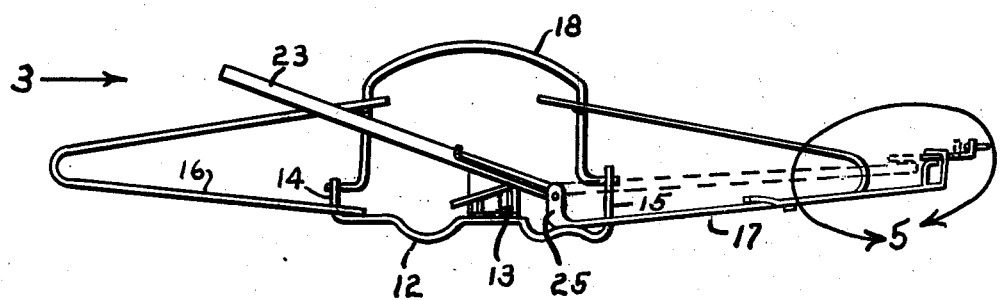
Fig. 1 is a side elevational view of the trap showing it in sprung condition.

Referring to the construction shown in the drawings which illustrate the principle of operation of this trap, I provide a base which consists of a longitudinal bar 12 to the middle of which a cross bar 13 is secured. The two end portions 14 and 15 of the bar 12 are bent upwardly at right angles from this bar which has downwardly curved portions for resting on the ground. In order to bring the tops of the end portions to a common level, the portion 15 is made longer than the portion 14 since it is bent from a lower level.

Figure 4:
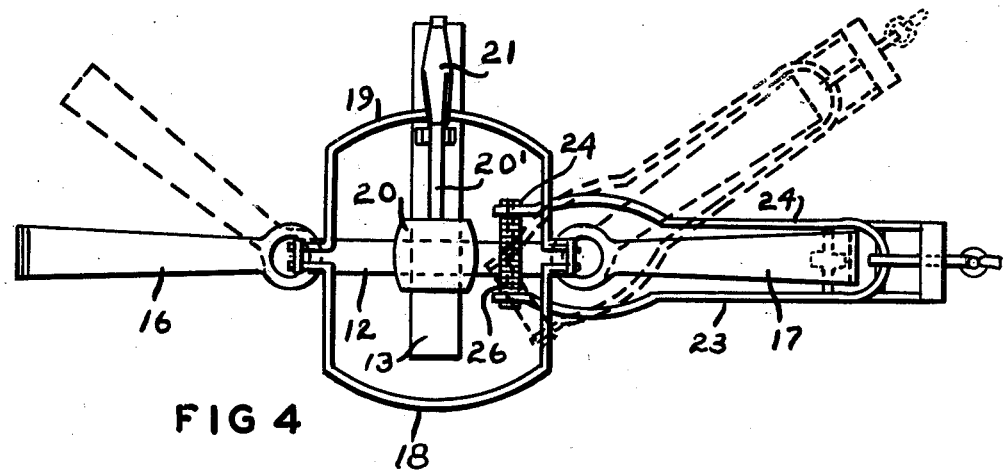
Fig. 4 is a top view of the trap in set condition.

The end members 14 and 15 constitute jaw posts for receiving openings in the lower ends of oppositely disposed elongated U-shaped springs 16 and 17 respectively. The ends of two jaws 18 and 19 are respectively pivoted in the jaw posts 14 and 15. These jaws at one end portion pass through an opening in the upper end of the spring 16. The opposite end portions of the jaws pass through an opening in the upper end of the spring 17 so that when the jaws are opened from the position shown in Fig. 1, these springs will be compressed. The jaw posts 14 and 15 below the pivoted attachment of said jaws thereto pass through openings in the lower arms of the elongated springs 16 and 17. This mounting of the two arms of the springs permits them to be turned into an angle with the base at the time that the trap is set. It is important for the proper operation of the trap that at least one of the springs such as the spring 17 be angularly positioned at the time the trap is set as indicated by the dotted lines in Fig. 4.

In order to hold the jaws in set open position, a pan or tread plate 20 carries an arm 20' which is pivoted to the cross bar 13. A dog 21 is also pivoted to this cross bar in such position that it is adapted to hold the pan 20 and the jaws in set position until the pan is depressed by the animal which is to be caught.

Figure 8:
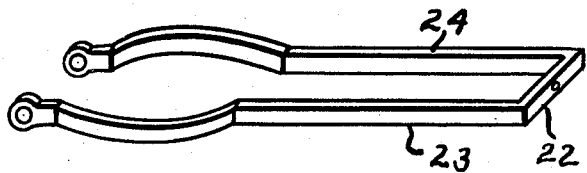
Fig. 8 is an isometric view of the detainer.
Figure 7:
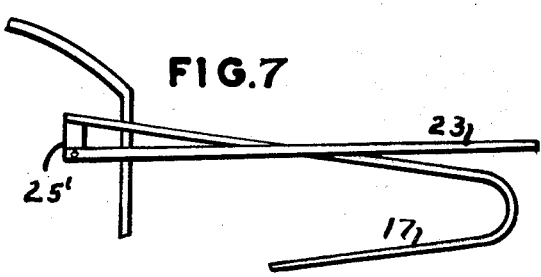
Fig. 7 shows an optional manner of mounting the detainer.

A very important feature of this invention consists of a detainer best shown in Fig. 8. This detainer has a middle portion 22 from which two arms 23 and 24 extend. The ends of these arms are pivoted to lugs 25 extending up from the lower arm of the spring 17 as will be understood from Figs. 1 and 2. As shown in Fig. 7, the detainer arms could be pivoted to lugs 25' extending downwardly from the upper arm of the spring 17. It is therefore apparent that the detainer is not attached to the base of the trap but is carried entirely by the elongated spring. When the trap is set, it is desirable to turn the spring 17 at an angle to the base of the trap and the detainer then swings around with the spring. This construction is very advantageous as will be explained later in connection with the description of operation. It will be understood that the detainer could be placed on either spring of a double spring trap.

Figure 2:
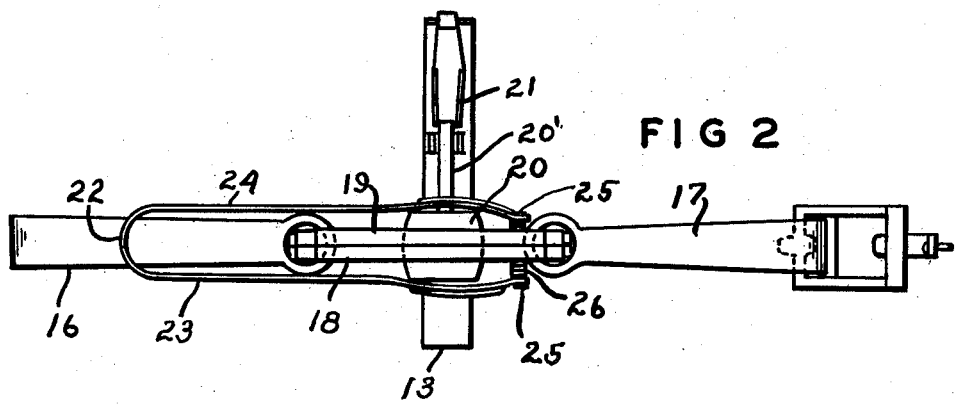
Fig. 2 is a top plan view of the trap.
Figure 3:
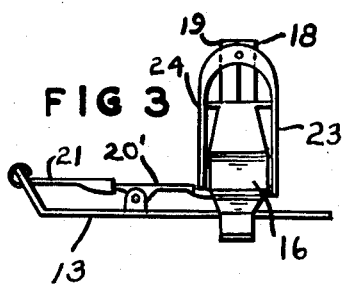
Fig. 3 is an end view looking in the direction of the arrow 3 in Fig. 1.

A coiled spring 26 is placed around the pivot of the detainer and as shown in Fig. 1, the ends of this spring engage the underside of the arms of the detainer and tend to swing the detainer upwardly when it is released by a releasing device now to be described.

Figure 5:
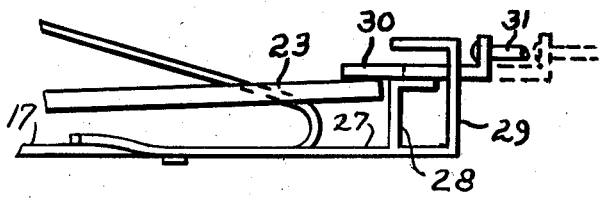
Fig. 5 is an enlarged detail view of a releasing device for a detainer, this view including the construction shown in the circle 5 of Fig. 1.
Figure 6:
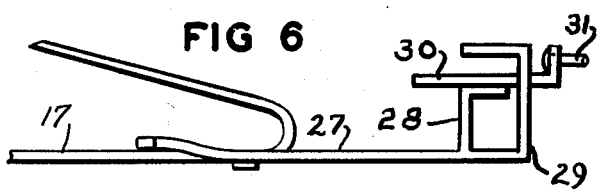
Fig. 6 shows the detainer release moved into a different position.

A member 27 is slidably mounted on an arm of the elongated spring as will be understood from Figs. 5 and 6. The member 27 carries upstanding supports 28 and 29 for a smaller slide 30 to the end of which is secured a member 31 to which the customary anchor chain of the trap is attached. It will be understood that the slide 30 is slidably supported on the member 28 and passes through a slot in the member 29.

The operation and advantages of my invention will be obvious in connection with the foregoing description and the accompanying drawings. The trap may be readily set by holding the jaws down and engaging the dog 21 with the pan or tread plate 20. At the same time, the elongated spring is turned at an angle to the base as indicated in dotted lines and the detainer is held down by engaging it with the release device which is slid into retracted position for this purpose. When the animal steps on the pan and depresses it, the jaws are released and quickly snap shut on the leg of the animal. When the animal pulls on the anchor chain in an effort to escape, the detainer is released and its spring tends to swing it upwardly into engagement with the body of the animal. However by locating the detainer on the spring which is placed at an angle when the trap is set, the detainer at first rests against the side of the jaw until the animal puts enough tension on the chain to pull the spring around into straight position and permit the detainer to pass over the jaws and engage the animal and prevent it from moving around to twist off or gnaw off the caught leg. The advantage resulting from locating the detainer on the spring which can be set at an angle instead of locating it on the base will now be apparent. This insures that the jaws are firmly closed before the detainer can swing up far enough to hit the animal and dislodge it. In case that the small slide should fail to release the detainer, then the animal by continuing to pull on the chain, operates the larger slide. The provision of the two release slides insured that the detainer will always be released.

I claim:

In an animal trap having an anchor chain, the combination of a base member, a pair of jaws pivoted to said base member for movement toward and away from each other, a tread plate, mechanism for holding said tread plate in set position and releasing it therefrom, an elongated spring associated with said jaws and adapted to be placed into angular relation with said base member, a tensioned detainer pivotally mounted on said spring, and a slide associated with said detainer for holding it down and for releasing it when the trapped animal pulls on the anchor chain to cause the detainer to strike the sides of the closed jaws and then by further pull on the anchor chain causes the detainer to contact the animal.

JACK C. BLUNT.

REFERENCES CITED

The following references are of record in the file of this patent:

UNITED STATES PATENTS

| Number | Name | Date |
| --- | --- | --- |
| 1,820,914 | Kinsley | Sept. 1, 1931 |
| 2,216,911 | Hannold | Oct. 8, 1940 |
| 2,311,378 | Galiano | Feb. 16, 1943 |